(12) United States Patent
Hu

(10) Patent No.: US 9,245,485 B1
(45) Date of Patent: Jan. 26, 2016

(54) DITHERING TECHNIQUES FOR ELECTRONIC PAPER DISPLAYS

(75) Inventor: Hao Hu, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 562 days.

(21) Appl. No.: 13/615,224

(22) Filed: Sep. 13, 2012

(51) Int. Cl.
*G09G 3/36* (2006.01)
*G09G 5/02* (2006.01)
*H04N 1/40* (2006.01)

(52) U.S. Cl.
CPC .............. *G09G 3/3611* (2013.01); *G09G 5/02* (2013.01); *H04N 1/40012* (2013.01)

(58) Field of Classification Search
None
See application file for complete search history.

(56) References Cited

U.S. PATENT DOCUMENTS

| 2010/0048242 | A1* | 2/2010 | Rhoads et al. ............. 455/556.1 |
| 2011/0279267 | A1* | 11/2011 | Xu et al. ....................... 340/540 |
| 2011/0285746 | A1* | 11/2011 | Swic ............................. 345/597 |
| 2013/0208190 | A1* | 8/2013 | Slothouber et al. ........... 348/731 |

* cited by examiner

*Primary Examiner* — James A Thompson
(74) *Attorney, Agent, or Firm* — Lee & Hayes, PLLC

(57) ABSTRACT

Techniques for generating dithered images for display on electronic paper displays set to one-bit display modes are described herein. An electronic device having an electronic paper display sets a display mode parameter associated with the electronic paper display to a one-bit display mode. The electronic device or a remote service further generates a dithered image from a monochrome image based at least in part on a one-bit dithering algorithm. While the display mode parameter is set to the one-bit display mode, the electronic device then displays the dithered image on the electronic paper display.

20 Claims, 4 Drawing Sheets

DITHERING TECHNIQUES FOR ELECTRONIC PAPER DISPLAYS

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for generating dithered images for display on an electronic paper display that is operating in a one-bit display mode. Typically, when displaying a video, an animation, or any sort of change to a displayed image, electronic devices equipped with electronic paper displays set those electronic paper displays to operate in a one-bit display mode. This one-bit display mode is often referred to as an "animation mode," a "fast mode," or a "fast display mode." In the one-bit display mode, pixels of an image are displayed on the electronic paper display as either black (e.g., color value 0) or white (e.g., color value 255). Pixels of the image having values different from 0 or 255 are mapped to either 0 or 255 based on being above or below a threshold. While the one-bit display mode enables quicker updating of the electronic paper display, the one-bit images it produces have far less fidelity to the original images they represent. Also, the one-bit display mode amplifies graphic artifacts, such as ghosting, on electronic paper displays that significantly detract from the user's experience.

Figure 1A:
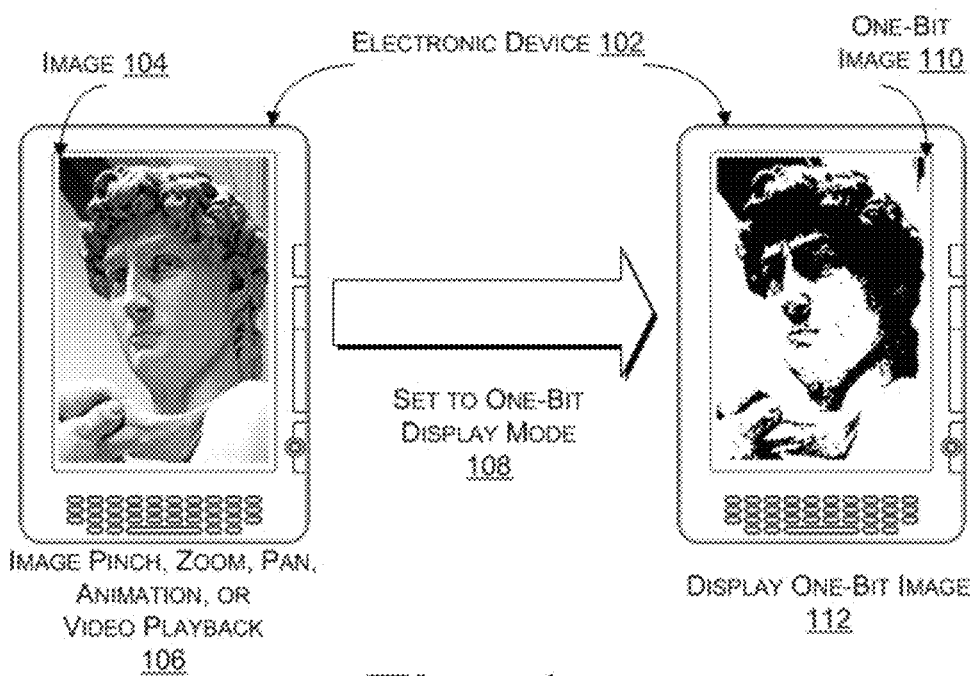
FIGS. 1a-1b illustrates an overview of various techniques for generating and displaying dithered images on electronic paper displays set to one-bit display modes.

FIG. 1a illustrates an electronic device 102 operating in one-bit display mode. As shown, the electronic device 102 may display an original image 104 on an electronic paper display of the electronic device 102. The image 104 may be a monochrome image, such as a grayscale image, or a dithered version of the monochrome image, such as a four-bit dithered image. At 106, a user may cause the electronic device 102 to operate in the one-bit display mode by initiating playback of a video or animation or by pinching, panning, zooming, or playing an animation comprising the image 104. The pinching, panning, zooming, and playing of an animation are examples of manipulation of the image 104; the user action at 106 may also or instead comprise other sorts of manipulations of the image 104. Responsive to the playback/animation or manipulation, the electronic device 102 may, at 108 set a display mode parameter of its electronic paper display to the one-bit display mode. The electronic device 102 may then generate a one-bit image 110 from the monochrome image by, for example, mapping color values to the black and white color values. The generated one-bit image 110 may represent the same or other frame of a video that include image 104 or a zoomed in/out or panned version of the image 104. The electronic device 102 may then display the one-bit image 110 at 112 while the electronic device 102 continues to operate in the one-bit display mode.

In various embodiments, an electronic device 102 implementing the techniques described in this disclosure provides an improved image while operating in the one-bit display mode by generating dithered versions of images and displaying the dithered versions while in the one-bit display mode. As in the one-bit display mode described above, all pixel colors in the dithered version of the image are black or white. In the dithered version of the image, however, these pixels collectively appear as varying shades of gray thanks to the dithering, thus providing higher fidelity renderings of images.

These dithered versions of images may be generated using any of a number of dithering techniques. Such techniques may be used to create the illusion of color depth in images with a limited color palette. Applied to this case, with a one-bit display mode that allows only black or white pixels, the dithering techniques may be any sort of techniques that generate dithered images that appear to be rich grayscale images while consisting entirely of black and white pixels. This effect may be achieved in any of a number of ways, such as alternating black and white pixels in some pattern.

Figure 1B:
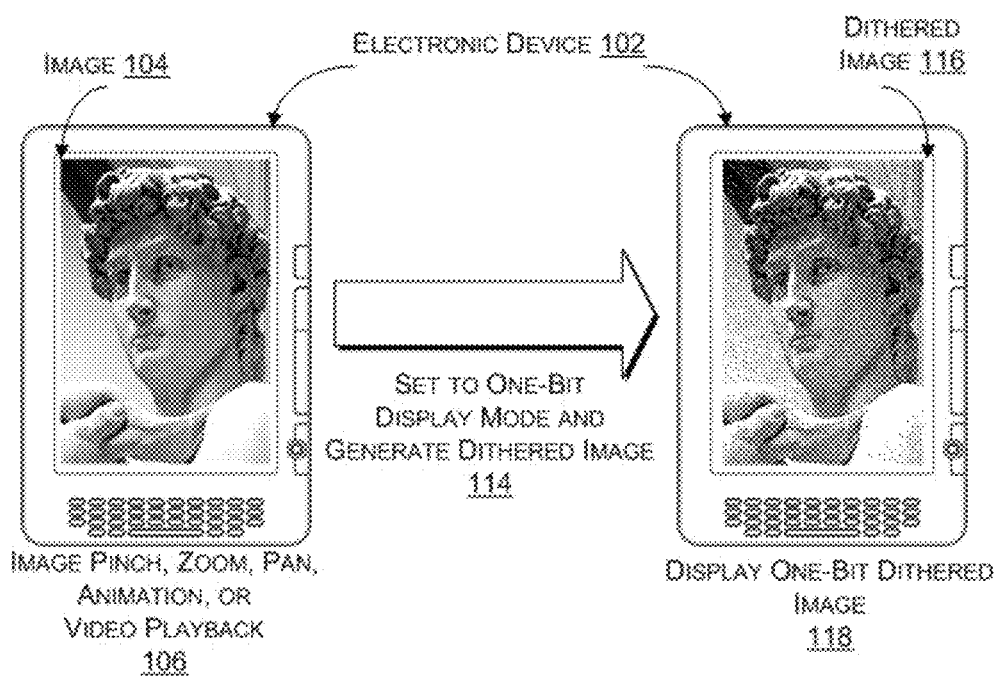

In FIG. 1b, the electronic device 102 is again shown displaying the original image 104. Also, at 106, a user may cause the electronic device 102 to operate in the one-bit display mode by initiating playback of a video or animation or by pinching, panning, zooming, or playing an animation comprising the image 104. Again, the pinching, panning, zooming, and playing of an animation are examples of manipulation of the image 104; the user action at 106 may also or instead comprise other sorts of manipulations of the image 104. At 114, responsive to the playback/animation or manipulation, the electronic device 102 sets the display mode parameter of its electronic paper display to the one-bit display mode. Also at 114, the electronic device 102 either receives one-bit dithered frames 116 of a video from a remote service or generates a one-bit dithered image 116 from a monochrome image. In generating a one-bit dithered image or frame 116, the electronic device 102 or remote service may utilize one or more dithering algorithms. Such algorithms may include an ordered dithering algorithm, a half-tone algorithm, a Sierra dithering algorithm, a Sierra Lite algorithm, or a Floyd-Steinberg dithering algorithm.

At 118, the electronic device 102 may display the one-bit dithered image 116 or one-bit dithered frames 116 on the electronic paper display. If displaying one-bit dithered frames 116, the electronic device 102 may display them in sequence. If displaying a one-bit dithered image 116 responsive to a manipulation of an image (either an image 104 or a one-bit dithered image 116), the electronic device 102 may maintain the setting of the display mode parameter to the one-bit display mode for a time period. A reason for doing so may be that users often make multiple manipulations of an image in sequence (e.g., zooming in then panning). While maintaining the setting, the electronic device 102 may display a visual indicator informing users that a multiple-bit display mode setting will be reverted to at the end of the time period. The electronic device 102 may also enable the users to customize the time period or terminate the one-bit display mode before the expiration of the time period. At the expiration of the time period, the electronic device 102 may set the display mode parameter to a multiple-bit display mode associated with display of the original image 104.

Example Device Architectures

Figure 2:
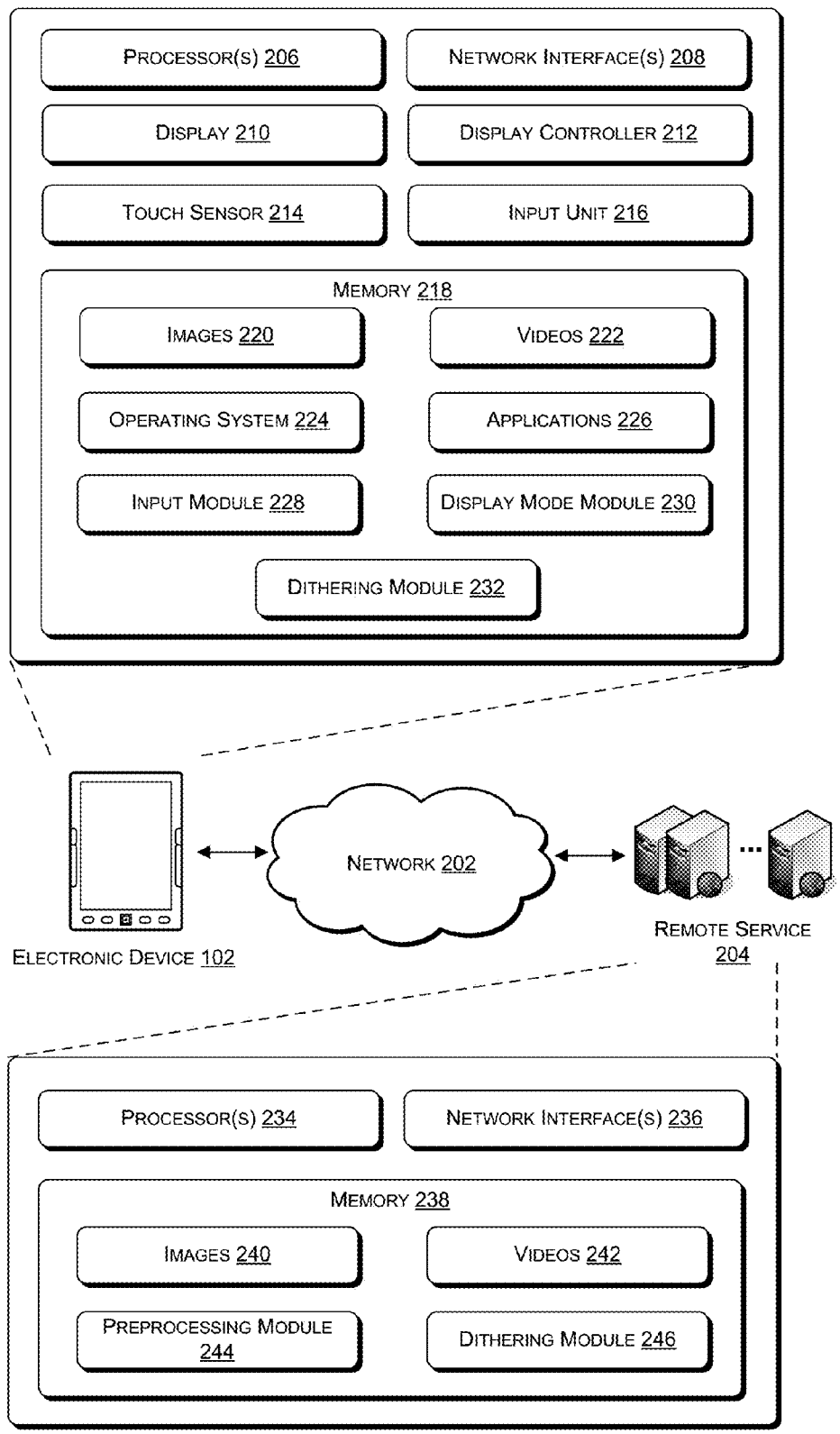
FIG. 2 illustrates a network including an example electronic device and an example remote service configured with functionality for generating and displaying dithered images on an electronic paper display of the example electronic device while the example electronic device is set to a one-bit display mode.

FIG. 2 illustrates a network including an example electronic device 102 and an example remote service configured with functionality for generating and displaying dithered images on an electronic paper display of the example electronic device 102 while the example electronic device 102 is set to a one-bit display mode. In various embodiments, the electronic device 102 may comprise any type of mobile electronic device (e.g., a laptop computer, a tablet computing device, an electronic reading device, a multifunction communication device, a portable digital assistant (PDA), etc.) or non-mobile electronic device (e.g., a desktop computer, a television, etc.). In addition, while FIG. 2 illustrates several example components of the electronic device 102, it is to be appreciated that the electronic device 102 may also include other conventional components, such as system busses, input/output components, and the like.

In various embodiments, the electronic device 102 includes one or more processors 206 and one or more network interfaces 208. The processor(s) 206 may include any one or more central processing units or graphic processing units. The network interface(s) 210 may support both wired and wireless connection to network 202 and various other networks, such as cellular networks, radio, WiFi networks, short range networks (e.g., Bluetooth), IR, and so forth.

The electronic device 102 also includes one or more displays 210 and corresponding display controllers 212. The one or more displays 210 (referred to herein as "electronic paper displays") may represent electronic paper displays and/or other displays having similar display properties to those of electronic paper displays. Electronic paper displays are also referred to as electronic paper displays.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, an electronic paper display comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

Of course, while one example has been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. In addition, while some of the displays described below are discussed as rendering black, white, and varying shades of gray, it is to be appreciated that the described techniques apply equally to electronic paper displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

The display controller(s) 212 may each be associated with a display 210 and may interface with display drivers of the electronic device 102, an operating system of the electronic device 102, and/or applications of the electronic device 102. The display controller(s) 212 may include hardware and/or software components configured to interface with and control the displays(s) 210. In some embodiments, the display controller(s) 212 may implement, entirely or in part, the dithering techniques describe herein.

In various embodiments, the electronic device 102 includes one or more touch sensors 214. In some instances, at least one touch sensor 214 resides underneath or on top of a corresponding display 210 to form a touch-sensitive display that is capable of both accepting user input and rendering content corresponding to the input. In other instances, the electronic device 102 may include a touch sensor 214 that is adjacent to a display 210. It is to be appreciated that each of the techniques described below may apply to instances where the touch sensor 214 and the display 210 form a touch-sensitive display and instances where the sensor 214 and the touch-sensitive display 210 do not.

The touch sensor 214 may comprise a capacitive touch sensor, an interpolating force sensitive resistance (IFSR) sensor, or any other type of touch sensor. In some instances, the touch sensor 214 is capable of detecting touches as well as determining an amount of pressure or force of these touches. For instance, the touch sensor 214 may comprise an ISFR sensor resident behind a display 210, such that a user is able to draw upon the display utilizing a writing instrument, such as a stylus, a finger of the user, or the like.

In some embodiments, the electronic device 102 may further include an input unit 216 in addition to the touch sensor 214. The touch sensor 214 is to be understood as one possible type of input unit 216. Other input units 216 may include keyboards, key pads, computer mice, joysticks, etc. The input units 216 may include any input mechanism.

Depending on the configuration of the electronic device 102, the memory 218 (and other memories described throughout) is an example of computer-readable storage media and may include volatile and nonvolatile memory. Thus, the memory 218 may include, but is not limited to, RAM, ROM, EEPROM, flash memory, or other memory technology, or any other medium which can be used to store media items or applications and data which can be accessed by the electronic device 102.

In various embodiments, the memory 218 may be used to store images 220. The images 220 may include static images, animations, and frames of videos. Images 220 may also include red-green-blue (RGB) images received from the remote service 204 or from other devices, services, or networks. In one embodiment, the images 220 may be included in or associated with other electronic content, such as an electronic book. The images 220 may also include monochrome images. The monochrome images may have been generated from corresponding RGB images by mapping pixel color values of the RGB images to monochrome pixel color values of the monochrome images. Such monochrome images may be gray scale images monochrome images associated with a different color filter. In some embodiments, the images 220 include monochrome images that are not associated with any corresponding RGB images.

The memory 218 may also store videos 222. The videos 222 may include RGB frames of a video, corresponding monochrome frames of a video, or dithered frames of a video that have been generated from monochrome frames. In some embodiments, the dithered frames may have been received from the remote service 204. The dithered frames may be one-bit dithered versions of monochrome frames. In other embodiments, the dithering module 232 of the electronic device 102 may generate the dithered frames from monochrome frames.

In some embodiments, the operating system 224 may be any sort of operating system. The operating system 224 may interface with the display controller(s) 212 to provide images 220 and/or videos 222 for display on the display(s) 210 as well as instructions for controlling the displaying of the images 220/videos 222. In some embodiments, the operating system 224 includes drivers for interfacing with hardware components of the display controller(s) 212. In some embodiments, drivers of the operating system 224 for interfacing with the display 210 may invoke the dithering module 232 to generate multiple-bit dithered versions of monochrome images 220 that are to be displayed on the display 210.

Applications 226 may include any sort of applications, including user-level applications of a platform of the electronic device 102 and third party applications. The applications 226 may include one or more modules for generating and/or providing images 220 and/or videos 222 for display. The modules of the applications may provide the images 220 and/or videos 222 to a driver of the operating system 224.

In some embodiments, the applications 226 may invoke the dithering module 232 when content to be rendered by the applications 226 includes images 220 or videos 222. When the content is video 222 or is an image 220 to be displayed in an interaction window for receiving gesture input, the applications 226 may also invoke the display mode module 230 to set the display mode parameter of the display 210 to a one-bit display mode.

In various embodiments, the input module 228 receives indications from drivers associated with the touch sensors 214 or input unit 216 of input associated with manipulation of a displayed image 220 or frame of a video 222. For example, a user may touch the display 210, making a pinching gesture with the user's fingers that is associated with a zoom action. Touch sensors 214 associated with the display 210 may detect the pinching gesture and pixel locations touched as part of the pinching gesture and may inform the input module 228. The input module 228 recognizes the pinching gesture as a zoom action. In response, the input module 228 invokes the display mode module 230 to set the display mode parameter of the display 210 to a one-bit display mode and invokes the dithering module 232 to generate a dithered image from a monochrome image that is associated with the displayed, interacted-with image. The input module 228 may provide the interacted with pixel locations to the dithering module 232 to facilitate the dithering module 232 in generating the dithered image.

In some embodiments, the input module 228 may also receive an indication that a user has provided input indicating a desire to resume a multiple-bit display mode. In response to receiving the indication, the input module 228 may invoke the display mode module 230 to reset the display mode parameter to the multiple-bit display mode.

In various embodiments, the display mode module 230 may be invoked by an application 226 or input module 228. The application 226 may invoke the display mode module 230 to play a video 222 or to provide an interaction window for an image 220, the interaction window allowing manipulation of the image 220. The input module 228 may provide an indication that a user has interacted with a displayed image 220.

Upon being invoked, the display mode module 230 may set a display mode parameter associated with the display 210 to a one-bit display mode. In the one-bit display mode, all images 220 and frames of videos 222 sent to the display 210 are displayed as one-bit images 110 by thresholding the monochrome color values of the pixels. Those pixels less than the threshold are mapped to a black color value (i.e., a value of 0) and those meeting or greater than the threshold are mapped to a white color value (i.e., a value of 255).

In some embodiments, the display mode module 230 maintains the setting of the display mode parameter to the one-bit display mode for a time period. The time period may be customizable by a user through a settings window or may be a set, non-customizable value. During the time period, the display mode module 230 may cause the display 210 to depict a visual indicator informing a user that the multiple-bit display mode will be reverted to at the end of the time period. The visual indicator may be an image or animation, such as an image or animation of a timer or an animation of shapes turning on and off in a pattern, indicating the passage of time. At the expiration of the time period, the display mode module 230 may reset the display mode parameter to a multiple-bit display mode. The multiple-bit display mode is sometimes also referred to as a "normal mode" or "normal display mode." As mentioned above, in the multiple-bit display mode, the electronic device 102 may display monochrome images 220 or multiple-bit dithered versions of the monochrome images 220.

In further embodiments, the display mode module 230 may receive an indication from the input module 228 that a user has provided input indicating a desire to resume multiple-bit display mode while the one-bit display mode is being maintained. In response to receiving the indication, the display mode module 230 may reset the display mode parameter to the multiple-bit display mode before the time period has expired.

In various embodiments, the dithering module 232 is invoked by a driver of the operating system 224, by an application 226, or by the input module 228 to generate a dithered image 220 or dithered frame of a video 222. When invoked, the dithering module 232 may receive an identifier of the image 220 or frame of video 222, an indication of a content type (e.g., image or video), and, if less than an entire image 220 or frame of video 222 is to be displayed, an identification of the portion of the image 220 or frame of video 222. For example, when a user is zooming or panning within an image 220 or frame of a video 222, the input module 228 may provide an identification of the portion to display based on the pixel locations interacted with. In response to being invoked, the dithering module 232 may query the display mode parameter to determine the current display mode of the display 210.

The dithering module 232 may then generate a dithered version of the image 220 or the frame of the video 222 based on one or more dithering algorithms. When the display mode is a multiple-bit display mode, the dithering module may apply multiple-bit dithering, such as four-bit dithering, to the image 220 or frame of video 222 to generate a multiple-bit dithered image or frame of video. The dithering module 232 may then provide the multiple-bit dithered image or frame of video to the invoking driver, application 226, or input module 228 or may provide the a multiple-bit dithered image or frame of video directly to the driver of the operating system 224 for displaying on the display 210.

When the display mode is a one-bit display mode, the dithering module 232 may utilize any one or more of an ordered dithering algorithm, a half-tone algorithm, a Sierra dithering algorithm, a Sierra Lite dithering algorithm, or a Floyd-Steinberg dithering algorithm to generate a one-bit dithered version of the image 220 or frame of the video 222 (or portion thereof). If the content type is video, the dithering module 232 may utilize an ordered dithering algorithm or half-tone algorithm which may be more suited for video than the other dithering algorithms. As described above, the resulting dithered image or frame may be composed entirely of black and white pixels but have the appearance of a gray scale image, with the black and white pixels arranged to appear as varying shades of gray. The dithering module 232 may then provide the one-bit dithered image or frame of video to the invoking driver, application 226, or input module 228 or may provide the a one-bit dithered image or frame of video directly to the driver of the operating system 224 for displaying on the display 210.

In some embodiments, the dithering module 232 may determine that the monochrome image 220 or frame of video 222 includes large areas of black pixels that, even after dithering, would remain black. Such large areas of black pixels may result in image artifacts such as ghosting. In response, the dithering module 232 may map the colors of the pixels of the image 220 or frame of video 222 to lighter colors. For example, a color value range of 0 to 255 (0 being black, 255 being white) may be mapped to a color value range of 50 to 255. The mapped image 220 or frame of video 222 may then be utilized by the dithering module 232 to generate the dithered image or frame of video.

In some instances, the electronic device 102 may have features or functionality in addition to those that FIG. 2 illustrates. For example, the device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 102 may reside remotely from the device 102 in some implementations. In these implementations, the device 102 may utilize the network interface(s) 208 to communicate with and utilize this functionality.

In various embodiments, the electronic device 102 is connected via a network 202 to the remote service 204. The network 202 may be include any one or more networks, such as wired networks, wireless networks, and combinations of wired and wireless networks. Further, the network 202 may include any one or combination of multiple different types of public or private networks (e.g., cable networks, the Internet, wireless networks, etc.). In some instances, the electronic device 102 and the remote service 204 communicate over the network 202 using a secure protocol (e.g., https) and/or any other protocol or set of protocols, such as the transmission control protocol/Internet protocol (TCP/IP).

Also, in further embodiments, the remote service 204 may comprise one or more computing devices, and each computing device may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing device(s) of the remote service 204 represent a plurality of computing devices working in communication, such as a cloud computing network of nodes. When implemented on multiple computing devices, the remote service 204 may distribute the modules and data 240-246 of the remote service 204 among the multiple computing devices. In some implementations, one or more of the computing device(s) of the remote service 204 represents one or more virtual machines implemented on one or more computing devices.

In some embodiments, the computing devices of the remote service 204 include processor(s) 234 and network interface(s) 236. The processor(s) 234 may be or include any sort of processing units, such as central processing units (CPU) or graphic processing units (GPU). The network interface(s) 236 allow the devices of the remote service 204 to communicate with one or both of the electronic device 102 and other devices. The network interface(s) 236 may send and receive communications through one or both of the network 202 or other networks. The network interface(s) 236 may also support both wired and wireless connection to various networks.

Depending on the configuration of the computing device(s) of the remote service 204, the memory 238 (and other memories described throughout) is an example of computer-readable storage media and may include volatile and nonvolatile memory. Thus, the memory 238 may include, but is not limited to, RAM, ROM, EEPROM, flash memory, or other memory technology, or any other medium which can be used to store media items or applications and data which can be accessed by the remote service 204.

In various embodiments, the memory 238 may be used to store images 240. The images 240 may include static images, animations, and frames of videos. In one embodiment, the images 240 may be included in or associated with other electronic content, such as an electronic book. Images 240 may also include red-green-blue (RGB) images and/or monochrome images. The monochrome images may have been generated from corresponding RGB images by mapping pixel color values of the RGB images to monochrome pixel color values of the monochrome images. Such monochrome images may be gray scale images or monochrome images associated with a different color filter. The remote service 204 may provide either or both of RGB images or monochrome images to the electronic device 102, either automatically or in response to a request from the electronic device 102.

The memory 218 may also store videos 222. The videos 222 may include RGB frames of a video, corresponding monochrome frames of a video, or dithered frames of a video that have been generated from monochrome frames. In some embodiments, the dithered frames may have been received from the remote service 204. The dithered frames may be one-bit dithered versions of monochrome frames. In other embodiments, the dithering module 232 of the electronic device 102 may generate the dithered frames from monochrome frames.

In various embodiments, the preprocessing module 244 may convert an RGB image 240 to a monochrome image 240 or may convert RGB frames of a video 242 to monochrome frames of a video 242. Such conversion may involve mapping RGB color values to monochrome color values.

The preprocessing module 244 may also generate dithered versions of monochrome images 240 or dithered versions of monochrome frames of a video 242. The preprocessing module 244 may generate these dithered versions responsive to a request for dithered versions of images/frames or may generate them independently of any request. To generate a dithered version, the preprocessing module 244 invokes the dithering module 246 and receives, in return, the dithered versions of the images/frames. The dithered versions may be provided to the electronic device 102 by the preprocessing module 244 in response to a request made of the preprocessing module 244 or may be provided to the electronic device 102 on their own or with other content (e.g., electronic books).

In some embodiments, the dithering module 246 is invoked by the preprocessing module 244 to generate a dithered image or dithered frame of a video. When invoked, the dithering module 246 may receive an identifier of the image 240 or frame of video 242, an indication of a content type (e.g., image or video), and, if less than an entire image 240 or frame of video 242 is to be displayed, an identification of the portion of the image 240 or frame of video 242.

The dithering module 246 may then generate a dithered version of the image 240 or the frame of the video 242 based on one or more dithering algorithms. The dithering module 232 may utilize any one or more of an ordered dithering algorithm, a half-tone algorithm, a Sierra dithering algorithm, a Sierra Lite dithering algorithm, or a Floyd-Steinberg dithering algorithm to generate a one-bit dithered version of the image 240 or frame of the video 242 (or portion thereof). If the content type is video, the dithering module 246 may utilize an ordered dithering algorithm or half-tone algorithm which may be more suited for video than the other dithering algorithms. As described above, the resulting dithered image or frame may be composed entirely of black and white pixels but have the appearance of a gray scale image, with the black and white pixels arranged to appear as varying shades of gray. The dithering module 246 may then provide the one-bit dithered image or frame of video to the preprocessing module 244.

In some embodiments, the dithering module 246 may determine that the monochrome image 240 or frame of video 242 includes large areas of black pixels that, even after dithering, would remain black. Such large areas of black pixels may result in image artifacts such as ghosting. In response, the dithering module 246 may map the colors of the pixels of the image 240 or frame of video 242 to lighter colors. For example, a color value range of 0 to 255 (0 being black, 255 being white) may be mapped to a color value range of 50 to 255. The mapped image 240 or frame of video 242 may then be utilized by the dithering module 246 to generate the dithered image or frame of video.

In some instances, the computing device(s) of the remote service 204 may have features or functionality in addition to those that FIG. 2 illustrates. For example, the computing device(s) of the remote service 204 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the computing device(s) of the remote service 204 may reside remotely from the computing device(s) of the remote service 204, in some implementations. In these implementations, the computing device(s) of the remote service 204 may utilize the network interface(s) 236 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 3:
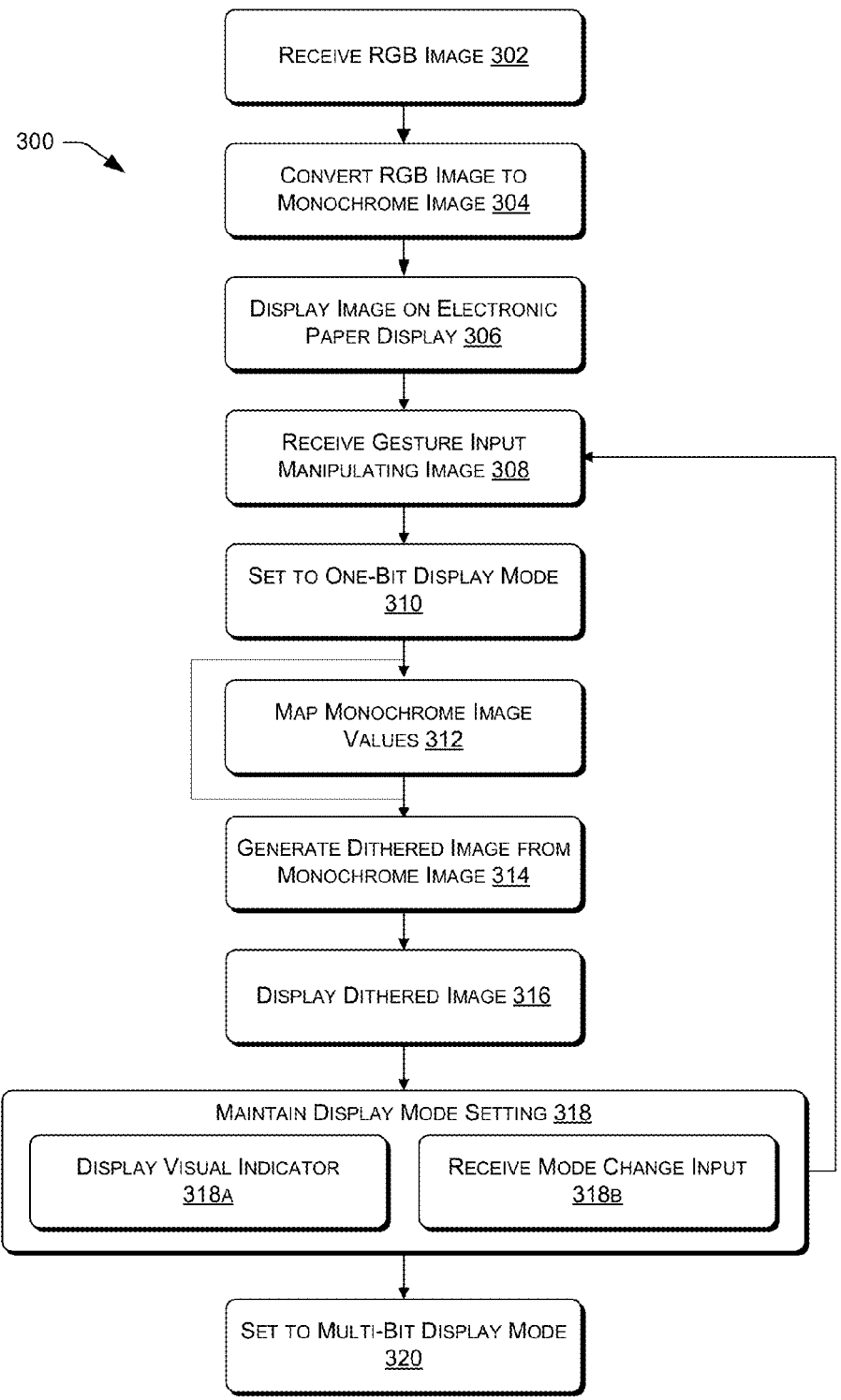
FIG. 3 illustrates an example process for setting a display mode parameter of an electronic paper display to a one-bit display mode responsive to receiving input associated with manipulation of a displayed image and, while the display mode parameter is set to the one-bit display mode, generating and displaying a dithered image.
Figure 4:
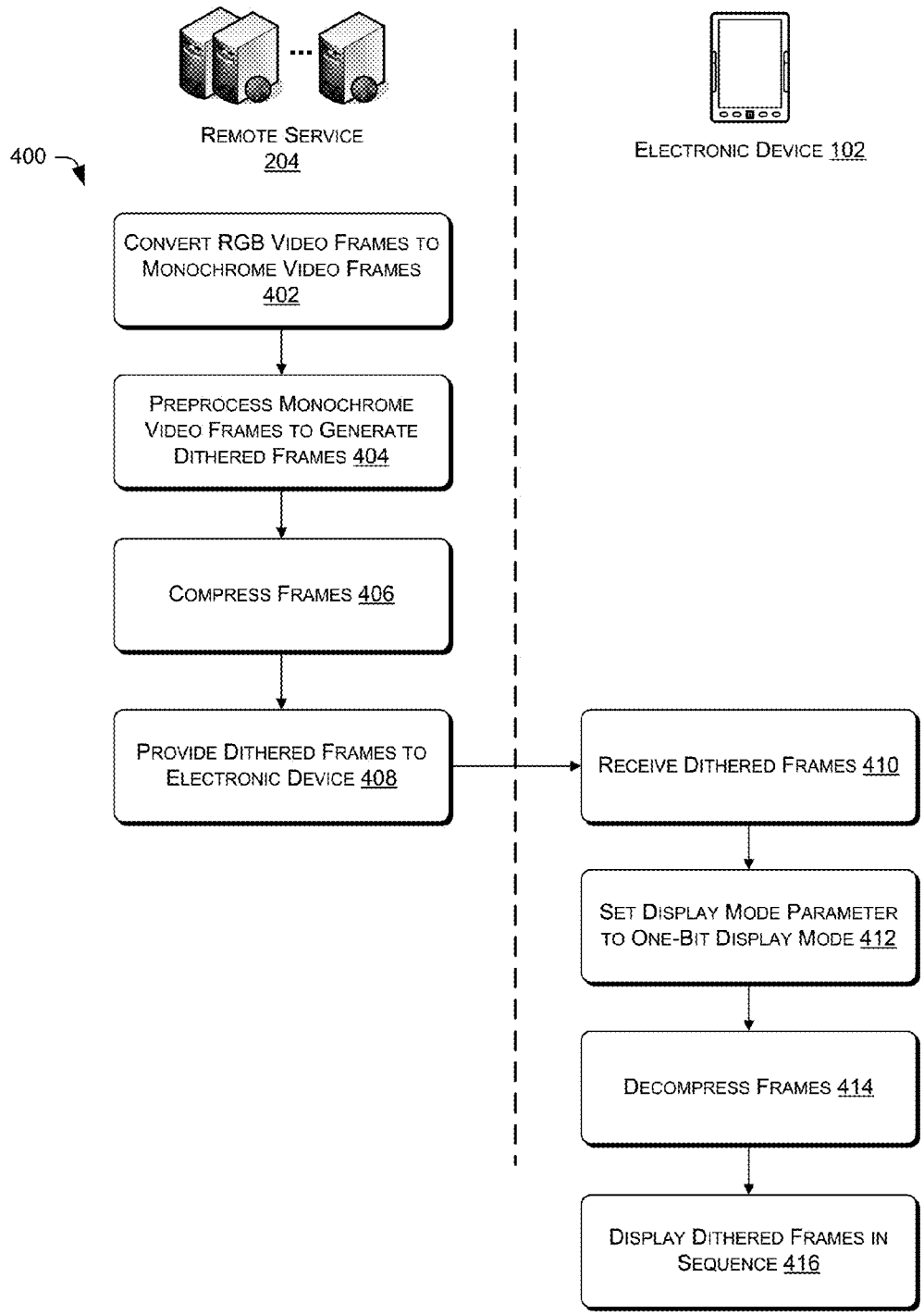
FIG. 4 illustrates an example process for receiving dithered frames of a video, setting a display mode parameter of an electronic paper display to a one-bit display mode, and, while the display mode parameter is set to the one-bit display mode, displaying the dithered frames in sequence.

FIGS. 3 and 4 illustrate example processes 300 and 400. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The process 300 includes, at 302, an electronic device 102 receiving a red-green-blue (RGB) image. The electronic device 102 may receive the RGB image from the remote service 204 or from another source. At 304, the electronic device 102 may convert the RGB image to a monochrome image, such as a gray scale image.

At 306, the electronic device 102 may display the monochrome image on an electronic paper display of the electronic device 102. In some embodiments, the electronic device 102 may display a four-bit dithered version of the monochrome image. At 308, the electronic device 102 may receive an input associated with manipulation of the displayed image. Such input may be touch input received through a touch sensor or other input unit of the electronic device 102 and may constitute a zoom gesture (also known as a "pinch") or a panning gesture.

At 310, responsive to receiving the input, the electronic device 102 may set a display mode parameter associated with the electronic paper display to a one-bit display mode. In some embodiments, the display mode parameter may already be set to the one-bit display mode when input has been previously received within a time period.

In some embodiments, at 312, the electronic device 102 may then map a range of monochrome color values of the pixels comprising the monochrome image to a subset of that range, the subset excluding a darker part of the range of monochrome color values.

At 314, the electronic device 102 may then generate a dithered image from the monochrome image based at least in part on one or more dithering algorithms. Such dithering algorithms may include any of an ordered dithering algorithm, a half-tone algorithm, a Sierra dithering algorithm, a Sierra Lite algorithm, or a Floyd-Steinberg dithering algorithm. At 316, the electronic device 102 may then display the dithered image on the electronic paper display.

At 318, the electronic device 102 may maintain the setting of the display mode parameter to the one-bit display mode for a time period after displaying the dithered image. In some embodiments, the time period may be customizable. At 318a, the maintaining includes displaying a visual indication that the display mode parameter will revert to a multiple-bit display mode at the end of the time period. At 318b, prior to expiration of the time period, the electronic device may receive input indicating a command to end the one-bit display mode and, in response, may set the display mode parameter to a multiple-bit display mode.

At 320, after expiration of the time period, the electronic device 102 may set the display mode parameter to a multiple-bit display mode. In the multiple-bit display mode, the electronic device 102 may resume displaying a four-bit dithered version of the monochrome image.

The process 400 includes, at 402, a remote service 204 converting RGB frames of a video to monochrome frames. Such monochrome frames may be gray scale versions of the RGB frames. At 404, the remote service 204 may preprocess the monochrome frames of the video. The preprocessing may include generating dithered frames from the corresponding monochrome frames based at least in part on one or more dithering algorithms, such as an ordered dithering algorithm or half-tone algorithm. Further, the preprocessing may include compressing the dithered frames for transmission to an electronic device 102. At 406, prior to transmission, the remote service 204 may compress the dithered frames. At 408, the remote service 204 may then transmit the dithered frames to the electronic device 102.

At 410, the electronic device 102 may receive the dithered frames from the remote service 204. At 412, the electronic device 102 may then set the display mode parameter of an electronic paper display of the electronic device 102 to a one-bit display mode. At 414, upon setting the display mode parameter to the one-bit display mode, the electronic device 102 may decompress the dithered frames. While the display mode parameter of the electronic paper display is set to the one-bit display mode, the electronic device 102 displays, at 416, the dithered frame in sequence on the electronic paper display.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a processor;
   an electronic paper display coupled to the processor;
   a touch sensor coupled to the electronic paper display and configured to receive a first input as a manipulation that manipulates a multi-bit image displayed on the electronic paper display, wherein the manipulation is a gesture associated with at least one of a zoom action or a panning action;
   a display mode module that, when executed by the processor, receives an indication from the touch sensor of the first input and, in response, sets a display mode parameter associated with the electronic paper display to a one-bit display mode; and
   a dithering module that, when executed by the processor:
      generates a one-bit dithered image from a monochrome image associated with the multi-bit image displayed on the electronic paper display, the one-bit dithered image generated based at least in part on a one-bit dithering algorithm;
      based at least partly on a determination that the display mode parameter is set to the one-bit display mode, provides the one-bit dithered image for display by the electronic paper display; and
      applies the manipulation to the one-bit dithered image displayed on the electronic paper display.

2. The system of claim 1, wherein the dithering module is further executed by the processor to maintain the setting of the display mode parameter to the one-bit display mode for a predetermined time period after providing the one-bit dithered image for display.

3. The system of claim 1, wherein the one-bit dithering algorithm is one of an ordered dithering algorithm, a half-tone algorithm, a Sierra dithering algorithm, a Sierra Lite algorithm, or a Floyd-Steinberg dithering algorithm.

4. A computer-implemented method comprising:
   displaying a monochrome image as a multi-bit image;
   receiving an indication of a first input associated with manipulation of the multi-bit image, wherein the manipulation is a gesture associated with at least one of a zoom action or a panning action;
   setting a display mode parameter associated with an electronic paper display to a one-bit display mode;
   generating a one-bit dithered image from the monochrome image based at least in part on a one-bit dithering algorithm;
   while the display mode parameter is set to the one-bit display mode, displaying the one-bit dithered image on the electronic paper display; and
   while the display mode parameter is set to the one-bit display mode, applying the at least one of the zoom action or the panning action to the one-bit dithered image based at least partly on the manipulation.

5. The method of claim 4, further comprising maintaining the setting of the display mode parameter to the one-bit display mode for a time period after displaying the one-bit dithered image.

6. The method of claim 5, further comprising displaying a visual indication that the display mode parameter will revert to a multiple-bit display mode at an end of the time period.

7. The method of claim 5, further comprising, prior to expiration of the time period, receiving a second input indicating a command to end the one-bit display mode and, in response, setting the display mode parameter to a multiple-bit display mode.

8. The method of claim 5, further comprising, after expiration of the time period, setting the display mode parameter to a multiple-bit display mode.

9. The method of claim 8, wherein the multiple-bit display mode is a four-bit dithering display mode.

10. The method of claim 4, further comprising generating the monochrome image from a red-green-blue (RGB) image.

11. The method of claim 4, wherein the one-bit dithering algorithm is one of an ordered dithering algorithm, a half-tone algorithm, a Sierra dithering algorithm, a Sierra Lite algorithm, or a Floyd-Steinberg dithering algorithm.

12. The method of claim 4, wherein the one-bit dithering algorithm is one of an ordered dithering algorithm or a half-tone algorithm, and wherein the monochrome image is a frame of a video.

13. The method of claim 4, further comprising mapping a range of monochrome color values to a subset of the range, the subset excluding a darker part of the range of monochrome color values.

14. The system of claim 1, wherein the first input causes initiation of a playback of at least one of a video or an animation.

15. The system of claim 2, wherein the touch sensor is further configured to receive a second input that sets the predetermined time period.

16. One or more non-transitory computer-readable media storing computer-executable instructions configured to program a computing device to perform operations comprising:

displaying at least one multi-bit frame of a video as a still image;

receiving a plurality of one-bit dithered frames generated from corresponding monochrome frames of the video based at least in part on a one-bit dithering algorithm;

receiving an input that causes a manipulation of the at least one multi-bit frame of the video displayed as the still image, wherein the manipulation is a gesture associated with causing initiation of a playback of the video;

setting a display mode parameter associated with an electronic paper display of the computing device to a one-bit display mode based at least partly on receiving the input that causes the manipulation; and while the display mode parameter is set to the one-bit display mode, displaying the plurality of one-bit dithered frames in sequence as the video on the electronic paper display.

17. The one or more non-transitory computer-readable media of claim 16, wherein the one-bit dithering algorithm is one of an ordered dithering algorithm or a half-tone algorithm.

18. The one or more non-transitory computer-readable media of claim 16, wherein the plurality of one-bit dithered frames are generated by a remote service in a preprocessing operation performed on the monochrome frames of the video.

19. The one or more non-transitory computer-readable media of claim 16, wherein the plurality of one-bit dithered frames are compressed, and the operations further include decompressing the plurality of one-bit dithered frames.

20. The one or more non-transitory computer-readable media of claim 16, wherein the operations further comprise, after displaying the plurality of one-bit dithered frames in sequence, setting the display mode parameter associated with the electronic paper display of the computing device to a multiple-bit display mode.

\* \* \* \* \*